3,310,125
METHOD FOR INCREASING DRILLING RATE
Henry C. H. Darley, Houston, Tex., assignor to Shell Oil Company, New York, N.Y., a corporation of Delaware
No Drawing. Filed Aug. 29, 1963, Ser. No. 305,542
7 Claims. (Cl. 175—66)

This invention relates to the drilling of oil and gas wells and pertains more particularly to a method of drilling wells which enhances the rate of drilling.

It is now generally recognized that the bar to faster penetration rates of a drill bit through an earth formation is not rock breakage but the removal of the chips and the rock debris from the bottom of the hole or well being drilled. One of the difficulties results from the tendency of the drilling fluid used in well drilling operations to form a filter cake on the bottom of the hole. This filter cake gives a rise to a pressure differential across the chips virtually equal to the full pressure differential between the column of mud in the well and the fluid in the chip or formation. The use of clear water as a drilling fluid avoids this problem and consequently the fastest drilling rates are obtained with clear water. Generally, however, it is necessary to use a drilling fluid which will lay down a filter cake in order to stabilize the size of the borehole and to prevent excessive filtrate losses to the formation traversed during drilling.

An ideal condition would be to use a fluid which would deposit a filter cake on the sides of the hole but not on the bottom of the hole. This approach is based on the assumption that, in the ideal condition, the mud cake at any spot on the bottom of the hole is removed every time a bit tooth strikes that spot. Therefore, it is desirable to employ a drilling fluid which will lay down little or no filter cake on a freshly exposed rock surface during the time interval between successive tooth strikes (0.2 second for a tricone bit rotating at 100 r.p.m.) but will lay down an adequate cake over a longer period of time.

During initiation of filtration (that is, the start of the liquid or continuous phase of the drilling fluid passing into the formation), the rate of mud cake formation is largely controlled by the concentration of particles in the size range required to bridge the pores of the rock. It is therefore a primary object of the present invention to provide a drilling fluid composition with a very low but critical concentration of particles in the bridging size range mixed with adequate amounts of fine colloid, so that it is not possible for the filter cake to form on the bottom of the borehole (because of time limitations) although a mud cake of adequate thickness and impermeability does form on the sides of the borehole where the time available is substantially unlimited.

One method of evaluating drilling fluids with respect to their influence on chip holddown (that is, the tendency of pressure to hold rock chips down on the bottom of the well as they are being removed by the bit teeth) yields an experimentally determined pressure drop which is expressed as a percent of the total pressure drop and used as a criterion for evaluating drilling fluids with respect to chip holddown. This percentage is commonly referred to as "chip holddown pressure." The less bridging solids a drilling fluid contains, the lower the chip holddown pressure and hence the greater the drilling rate. The greatest improvement to drilling rate is realized when the solids content of a drilling fluid is below 1% and the rate is significantly improved when the solids content is less than 2%. Drilling operations have shown that high rates of penetration are obtained at low concentrations of bridging solids in the drilling fluid.

It is a further object of the present invention to provide a method of obtaining optimum penetration rates in well drilling operations by employing a drilling fluid having a solid content as close to optimum as possible.

The minimum solids content of a mud, of course, is determined by the amount required to bridge the pores of a permeable formation within the well without excessive losses of drilling mud to the formation. Experience shows the optimum to be about 0.5% solids by weight of the total drilling fluid.

Tests show that particles in the size range of 2–10 microns are required to bridge a sandstone having a permeability around 200 md. In the drilling of a well the permeability of the rocks encountered covers a wide range and a correspondingly wide range of bridging particles is required. Fortunately, the drilling process generates particles of all sizes. Thus, no bridging solids need be added; on the contrary, the problem is to prevent the solids from building up above the ideal 0.5%. It is therefore another object of the present invention to provide a method of drilling wells at a high rate of penetration while maintaining the solids content of the drilling mud at a selected minimum level.

It is also an object of the present invention to provide a well drilling method employing a drilling fluid having an unusually low viscosity which permits rapid settling of the solids in a mud pit at the surface.

A still further object of the present invention is to provide a well drilling method employing a drilling fluid composition wherein the solids content may be maintained at a low value during drilling operations.

Still another object of the present invention is to provide a method of drilling wells at rates close to those obtainable when using water as a drilling fluid while at the same time providing good filter loss control.

Another object of the present invention is to provide a well drilling method employing drilling fluid compositions of relatively heavy weight and having good filter loss control but which contain a small, helpful, proportion of insoluble solids.

A further object of the present invention is to provide a well drilling method employing a completion fluid for use in wells which have been drilled and completed, said completion fluid forming a sheath on the borehole wall to give good filter loss control, which sheath is readily soluble in many conventional solvents.

It is also an object of the present invention to provide a well drilling method employing a drilling fluid composition which is adapted to form a good filter loss control sheath on the borehole wall, which sheath is of a character such as to permit acid to attack carbonate rocks on which the sheath is formed.

A still further object of the present invention is to provide a method of drilling wells through hard formations where the rate of penetration is particularly a problem.

These and other objects of this invention will be understood from the following description of the invention.

The drilling fluid composition used in the method of the present invention constitutes a drilling emulsion which includes a water phase free of insoluble solids when made up and added to a well, an oil phase of up to 30% and preferably from about 1 to 5% by weight of the drilling emulsion emulsified in the water phase, an emulsifier of from about 0.1 to 1.0% by weight of the emulsion, from 5 to 100% of the oil phase being an oil-dispersible colloid dispersed therein and the water phase including at least 5% by weight of at least one soluble inorganic salt dissolved therein. In drilling with this fluid, it is circulated to the surface and settled to reduce the insoluble solids content to less than about 2% by weight and recirculated within the borehole. In preferred high density fluids of the present invention the water phase contains at least about 5% dissolved inorganic salt to provide a density greater than that of water.

A unique feature of the low-solids colloid emulsion drilling fluid of the present invention is that the colloid, which is used for filter loss control purposes, is placed in the dispersed phase of the drilling fluid. For example, an organic colloid is dispersed in oil, and the oil is then emulsified in water to form the drilling emulsion. The absence of colloid from the water phase results in a drilling fluid of unusually low viscosity and permits rapid settling of solids. Thus, a low solids content can be maintained during drilling operations. The present type of drilling fluid is capable of providing drilling rates close to those obtainable with water and also provide good filter loss control throughout the drilling operations. Various oil-dispersible colloids can be added to the oil phase in the preparation of oil-water emulsions of the present invention.

When a weighted drilling fluid is required during the drilling operations, emulsions in accordance with the present invention are made with various brines or have soluble salt added thereto. Thus, emulsions of the present invention may be made in sodium chloride brines to obtain densities up to ten pounds per gallon, in the calcium chloride brines for densities up to 11.8 pounds per gallon and in zinc chloride brines for densities up to 14 pounds per gallon. Soluble salts are employed as weighting agents since conventional weighting agents, such as barite, cannot be used to increase the density of a low-solids drilling fluid composition of the present invention because the particle distribution of barite is in the unwanted bridging size range. It will be appreciated that use of dense brines requires the use of emulsifiers which are capable of maintaining the emulsions stable at bottom hole temperatures. A number of the emulsifiers are available, and the choice of one for a particular well depends on such factors as the salt used, the bottom hole temperature expected, the nature of the formation to be drilled, etc.

In general, most conventional water-base drilling fluids must contain a colloid, such as clay, starch or carboxymethylcellulose, which forms a filter cake on the sides of a well and controls the flow of filtrate into the formation. In these conventional muds, the colloids in the continuous phases raise the viscosity of the fluids and thereby inhibit fast drilling and also inhibit the separation at the surface of particles (bit cuttings) generated by the drilling process so that the solids content of the fluids increase, thereby further decreasing the drilling rate. These disadvantages are overcome in a water-base drilling fluid in accordance with the present invention by dispersing an oleophilic colloid in oil and emulsifying this dispersion in water, thus dispersing the colloid in the discontinuous phase. Oleophilic colloids, mixed with a small proportion of insoluble solids, form filter cakes which are very effective in controlling the filtrate of water, and thus only a small amount of colloid dispersion is needed to insure low filter rates. The continuous phase of the emulsion is water and the viscosity is virtually that of water, yet the filtrate rate is low.

The present emulsions were developed as low viscosity, low solids content, and low filter loss drilling fluids. The outstanding characteristic is that the filtration control agent is in the dispersed stage and hence does not affect the viscosity of the continuous phase. For instance, an oleophilic colloid can be dispersed in oil, which is then emulsified in water. Because of the high resistance of an oleophilic mud cake to the flow of the water, comparatively small amounts of colloid are required to obtain good filter loss control within a well. The oil phase may amount to as little as 5% of the gross volume, and hence the viscosity of the fluid is essentially that of the aqueous phase. The very low viscosity of the present colloid emulsions permits rapid settling of the drilled solids and hence enables the solids content of the drilling fluid to be kept low. In addition, the viscosity of a drilling fluid influences drilling rate considerably and that the low viscosity of colloid emulsions would be as important a factor as chip holddown pressure in obtaining fast penetration rates on low permeability rocks. Because of the low viscosity and rapid settling properties, the solids contents of the present drilling fluids are readily maintained in the range of from about 0.5 to 2% in respect to the fine particles of inorganic material present in the fluid in contact with the bottom of the borehole. Such solids are generated by the drilling bit and are entrained as the fluids flow past the bit. At the surface the solids are settled out of the fluids in the mud settling tanks or pits. In general, the optimum proportion of solids, about 0.5 to 1% by weight, can be readily attained in the course of the conventional settling in the conventional types of settling tanks or pits. In certain situations, such as those in which the bit generates unusually large amounts of fines, it may be desirable to enhance the rate of settling by means of cyclones, centrifuges, or the like.

Many oil-dispersible colloids can be used to make colloid emulsion drilling fluids in accordance with the present invention. Several examples are given in Table A together with the chip holddown pressure, API filter loss and in some cases the drilling rate on various Berea sandstone as obtained with a 1¼" bit in a drilling machine. The efficiency of an oleophilic cake formed by a mud in accordance with the present invention for controlling filter loss can be judged from the results of Example 4. In this case an oil-wet and oil-dispersible bentonite was employed. A filter loss of 8.8 cc. was obtained with the colloid emulsion containing only 0.75% oil-dispersible bentonite, compared with a filter loss of 16 cc. obtained with a conventional aqueous suspension containing 5% bentonite.

TABLE A

| Example | Percent Colloid | Percent Oil | Percent Emulsifier | API Filter Loss, cc. | Chip Hold-down Pressure | Drilling Rate, ft./hr. |
|---|---|---|---|---|---|---|
| 1 | 2.5 | 5 | 1 | 5.0 | 36 | ND |
| 2 | 2.5 | 5 | 1 | 5.0 | 27 | 26 |
| 3 | 1.7 | 5 | 1 | 5.0 | ND | ND |
| 4 | 0.75 | 5 | 1 | 8.8 | 25 | 21 |
| 5 | 0.3 | 5 | 1 | 7.2 | 30 | 19 |
| 6 | 1.0 | 10 | 2 | 3.1 | 38 | ND |
| 7 | 2.5 | 5 | 0.25 | 8.8 | 15 | 34 |
| 8 | | | | | | 40 |

Colloids dispersed in diesel oil and emulsified in water. ND=no date. Colloids used in Examples: (1) methacrylic polymer, (2) polyisobutylene, (3) dimethylpolysiloxane, (4) oil-dispersible bentonite, (5) oil-dispersible lignite, (6) carbon black, and (7) blown asphalt. Example 8, only water was used. Drilling rates obtained on test drilling machine, 200 lb. pressure on bit, 60 r.p.m. rotation of bit, and circulated 8 gallons per minutes. Chip holddown pressures on conventional muds vary from 70 to 100 or more.

From the Table A it may be seen that colloid emulsion mud in accordance with the present invention can be made using various oil-dispersed colloids, with the resulting muds having acceptable total loss characteristics (that is, below 10 cc. API) as well as having relatively low holddown pressures and drilling rates that approach those obtained using just water as a drilling fluid.

In another series of drilling tests shown in Table B, several different colloid emulsion drilling fluids in accordance with the present invention were compared with several conventional drilling muds and with water. All of the tests were drilled close together in the same block of sandstone. It will be seen that the colloid emulsion drilling fluids in Examples 4, 5 and 6 have lower holddown pressure than the conventional muds in Examples 1, 2 and 3 while the rate of drilling with the colloid emulsion muds was approximately twice that with conventional mud.

TABLE B

| | Drilling Fluid | Chip Holddown Pressure | Drilling Rate, ft./hr. |
|---|---|---|---|
| 1 | Xact clay mud, 9.6 lb./gal | 83 | 13 |
| 2 | Milk emulsion, 0.5 guar gum | 64 | 18 |
| 3 | Milk emulsion, 2% prehydrolysed starch, 5% diesel oil, 0.25% emulsifier. | 43 | 20 |
| 4 | Emulsion, 2.5% blown asphalt, 2.5% diesel oil, 0.5% emulsifier. | 29 | 35 |
| 5 | Emulsion, 1.0% blown asphalt, 4.0% diesel oil, 0.25% emulsifier. | 22 | 40 |
| 6 | Emulsion, 2.5% blown asphalt, 7.5% diesel oil, 0.5% emulsifier. | 16 | 43 |
| 7 | Water | 0 | 83 |

Emulsifier used was a non-ionic polyoxyethylene polymer (Atlosol S. manufactured by Atlas Powder Co.). Drilling rate test carried out at 100 r.p.m., 2000 lb. on the bit with mud circulating at 8 gal. per minute.

Field tests brought out the results shown in Table A and B. In one field a carbonate formation traversed by a well was drilled with a colloid (asphalt) emulsion drilling fluid in accordance with the present invention to which calcium chloride had been added to weight the drilling fluid to 9 pounds per gallon. The drilling rate when using the colloid emulsion mud was approximately twice the drilling rate of an adjacent well in which a low solid lime mud had been used. In another oil field a colloid emulsion mud was tested in three wells and the drilling rates were 45% faster than the drilling rate in the fastest wells previously drilled on the same lease. The average footage per bit was also increased by 11%.

As indicated hereinabove, soluble salts are employed to weight the colloid emulsion drilling fluid of the present invention. The selection of the emulsifier used, as previously noted, depends upon the soluble salt used, the bottom-hole temperature expected and the nature of the formations to be drilled. Various emulsifiers performing an oil and water emulsion may be employed. Several suitable emulsifiers are listed below in Table C which may be used under varying conditions.

TABLE C

Atlosol S (polyoxyethylated sorbitan tall oil ester)
DME (polyoxyethylated phenol)
CPB (cetylpyridium bromide)
Arquad 12–50 (monoalkyl quaternary amine)
Arquad 18–50 (monoalkyl quaternary amine)
Ethoquad (0/20 ethoxylated quaternary amine)
Redicote $E_{11}+E_{12}$ (amines+ethoxy-phenol)

Actinol P (tall oil+NaOH)
Sunaptic C (naphthenic acid+NaOH)
Triton X 171 (alkaryl polyether alcohol)
Lecithin
Seecomul (rosin+fatty acid soap)
Pluronic L661 (polyoxyethylene polyproplylene)
Metal lignosulfonates+NaOH
Ca lignosulfonate+NaOH
Carbonox (lignite)+NaOH
White Magic (lignite)+NaOH
Quebracho+NaOH The first seven emulsifiers listed, when used in asphalt emulsions of the present invention had good to excellent temperature stability in some cases up to 400° F. and when sodium chloride or calcium chloride was added in amounts from 1% to saturation for weighting purposes. All of the emulsifiers had good temperature stability at high temperatures with low concentration of sodium chloride. In colloid emulsions made with asphalt, best results are obtained when the pH of the asphalt emulsions is kept in the range of 7–10. With the exception that when metal lignosulfonates are used as the emulsifiers in sodium chloride emulsion, the pH of the emulsion should be raised to at least 10.

Of the colloids used in making emulsions, asphalt is preferred in most areas as this oil-dispersible colloid has the required properties, is cheap and readily available. Moreover, it is readily soluble in any aromatic oil and this is a major advantage in well completion. The best emulsions with respect to filter loss control were made by dispersing various types of asphalt in a suitable oil such as diesel, but undiluted asphalt can be used. If it is not desired to mix the asphalt and the oil together, various commercial mixtures are available which are generally a 50/50 dispersion of blown asphalt and diesel oil having a 140° F. aniline point. Refinery asphalts such as coating grade asphalt were also dispersed in diesel oil to make satisfactory emulsions. Satisfactory asphalt emulsions were also made from heavy asphaltic crude oil. Quite good emulsions were made with Ventura and Coalinga crudes, and excellent emulsions were made with Athabasca tar oil. Some crudes have the advantage that they can be emulsified with water to form a colloid drilling emulsion by adding sodium hydroxide which forms sodium naphthenate with the naphthenic acids in the crude. The amount of asphalt in the oil phase may vary from 5 to 100%. The asphalt emulsions have the unusual characteristics of the filtration rates at lower and higher temperatures.

Asphalt emulsions form exceedingly thin filter cakes with virtually no penetration of the asphalt into the pores of the rock. Photomicrographs of the surface of rock plugs show that asphalt from a colloid emulsion did not form a continuous filtrate on either Berera sandstone or an Indiana limestone but formed plugs between the grains leaving much of the matrix exposed. This is an important advantage in acidizing carbonate rocks.

The mechanism of cake formation is the same with asphalt emulsions as with conventional muds. The bridges formed at the bottlenecks in the surface pores, and the asphalt colloids filter out thereon. Because of the low content of bridging solids and the low permeability of the asphalt to water, a dense compact cake is formed at the constrictions in the flow channels where the cross sectional flow area is lowest. The combination of the these factors is responsible for the very low filtration rate. The results of drilling test show that asphalt emulsions gave faster drilling rates than any other type of drilling fluid.

In one field test a colloid drilling fluid was used wherein the 50/50 mixture of dispersed asphalt in diesel oil varied from 2 to 5% while the emulsifier (Atlosol S) varied from 0.5 to 0.75% with 20% calcium chloride present to give a 9 pound per gallon mud having a funnel viscosity of 28 seconds, a 30 minute API water loss of 8 seconds and a solids content of less than 1%. The average drilling rate in the well was 88 feet per day which was almost equal to the rate obtained with clear water in an adjacent well. Using conventional lime mud in the adjacent well the average rate was 50 feet per day. Furthermore, bit life was nearly double in the well in which asphalt emulsion was used.

The colloid emulsion drilling fluids of the present invention are preferably used in a method of drilling wells wherein the drill bit is rotated in the bottom of the well to produce cuttings while the low solids content fluid is simultaneously pumped into the well and through the drill bit and up the inside of the well where the returning drilling fluid is treated at the surface to reduce the entrained earth solid contents made up of the cuttings. Since the colloid drilling emulsion has a low viscosity, the entrained earth cuttings tend to drop out immediately thus reducing the solids content to an extremely low value. Thus, it will be seen that there are few solids in the fluid as it returns to the well which interfere with the cutting of new chips by the bit. By settling or centrifuging the particle laden returning mud in a conventional manner a solids content can be readily reduced below 1% by weight when drilling through most formations. In drilling through some hard formations it has been found that the solids content of the present colloid emulsion mud can be readily reduced to ½ of 1% by conventional means. Thus, the colloid emulsion mud of the present invention generally has no more than ½ to 1% solids and never more than 2% solids in it when it is again pumped down into the well. This compares with from 3 to 10% solids remaining in conventional mud as they return to the well in conventional mud systems. In most cases, at least 5% by weight of inorganic salt would be used in the colloid drilling emulsions to weight them.

Evidence from the field suggests that mud cakes formed by conventional drilling muds are a common cause of productivity impairment. Mud cake causes damage when it is left behind the oil string or gravel packs, or when it forms in formation fractures or shot perforations. Mud cakes or conventional muds are highly insoluble; even mud acids have little solvent action, although they may be beneficial for other reasons. In some cases, flow from the formation may be able to displace the mud cake back into the hole, but the flow velocity in a producing well is generally too low to lift the solids, and they tend to accumulate at the bottom of the hole.

These difficulties can be avoided by using asphalt emulsion drilling fluids in accordance with the present invention. An apshalt emulsion of the present invention forms very little cake; moreover, this cake is soluble in many crudes or can be removed by an aromatic solvent wash. Thus, emulsifying asphalt in brines would provide completion fluid with good filter loss control, with densities up to 14 pounds per gallon and with virtually no insoluble solids.

Conventional mud forms a continuous filter cake over permeable sections of carbonate rocks, and this cake is fairly resistant to acid attack.

As mentioned hereinabove, asphalt emulsions of the present invention do not form a continuous filter cake on the formation but merely plug the surface pores. Thus, acid can attack the exposed matrix to penetrate past the asphalt plugs.

In an acidization test, asphalt emulsion was filtered out on Indiana limestone plugs 1″ in diameter, 1.7″ long and which were then treated with 10% hydrochloric acid. The acid broke through two plugs in 2 and 3 minutes respectively which were protected with an asphalt emulsion cake. Similar plugs were treated with six different conventional drilling fluids and the filter cakes thereon prevented acid from passing through the plug in a two hour test. Where water had been used as a drilling mud with the plug, acid broke through the plug in 11 minutes. Thus, it may be seen that the asphalt emulsions of the present invention are excellent as completion fluids.

Asphalt emulsions in accordance with the present invention have previously been considered unsuitable for drilling through formations containing significant portions of shales and clays as most emulsifiers employed in forming the emulsion either did not promote the deposition of asphalt on shale formations and cuttings, or did not form an emulsion of say a 5% oil-blown mixture emulsified in water which was stable to contamination by shale cuttings at high temperatures and in the presence of various formation salts. Thus, emulsions made with metal lignosulfonates as an emulsifier, while being stable in the presence of ground shale, did not tend to coat the shale cuttings and preserve them in their original size. Emulsions of this type used in drilling the more dispersible shale formations would cause borehole enlargement sufficient to reduce the velocity of the drilling fluid returning up the well so that it might not be able to lift the cuttings in the enlarged section of borehole. Additionally, since the shale cuttings could disperse or disintegrate into very fine particles the amount of drilled solids carried by the drilling fluid system would increase rapidly. The disintegrated or finely divided particles of shale are most difficult to remove from the drilling fluid system and a large portion of them are necessarily recirculated down the well in the above example where their presence causes a reduction in the rate at which a well is drilled.

When asphalt emulsion drilling fluids in accordance with the present invention were made using cationic emulsifiers and contaminated with shale cuttings in laboratory tests, the shale cuttings were in all cases coated with asphalt and excellent protection from dispersion or disintegration was obtained. However, many of the cationic emulsifiers caused such a rapid and so heavy a deposition of blow asphalt from the bit cuttings in the shale formation that very soon there was little asphalt left in the drilling fluid to be used with new cuttings added. This caused a resulting high loss of water phase from the drilling fluid prior to the addition of greater amounts of diesel oil and blown asphalt.

Therefore, in addition to using from about 0.1 to 1.0% of an emulsifier in the form of an organic cationic colloid deposition-inducing agent to make asphalt emulsion drilling fluids for drilling through many types of formation in accordance with the present invention it was also desirable, in many cases to add from about 0.1 to 1.0% of a colloid deposition-retarding agent which is preferably non-ionic, and serves to retard the deposition of blown asphalt on shale. One particularly good non-ionic colloid deposition-retarding agent is manufactured by Armour Industrial Chemical Company and is sold under the tradename Redicote E12.

The deposition-retarding agent Redicote E12 may be made by reacting an alkylphenol, such as octyl or nonyl phenol with from 2 to 16, preferably from 3 to 12 moles of alkylene oxide such as ethylene and/or propylene oxides, preferably the ethylene oxides, to yield a preferentially water soluble alkyl phenoxy polyalkylene glycol having the formula

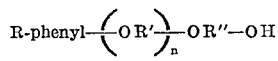

wherein $n$ is an integer of from 2 to 16 preferably from 3 to 12, R is an alkyl radical of from 4 to 20 carbon atoms, preferably 4 to 16 and R′ and R″ are the same or different alkylene groups such as ethylene or propylene groups. If desired, small amounts of other amines may be added as anti-oxidants and corrosion inhibitors. Thus, the colloid deposition-retarding agent may include a minor portion say 0.5 to 3.0% of an aliphatic amine having from 1 to 12 carbon atoms and preferably from 3 to 8 such as butyl or dipropyl amine. In addition a small amount, say from 0.5 to 2.0% by volume of the colloid deposition-retarding agent may consist of preferably a mono-nuclear aromatic amine such as diphenyl amine, dicresyl amine or dinaphthyl amine. It is believed that the colloid deposition-retarding agent plates out on, or oil proofs, any shale or shale cuttings that it comes in contact with to hinder the blown asphalt and cationic emulsifier or colloid deposition-inducing agent from coating the shale immediately or to an excessive degree. However, it is to be understood that an adequate coating of asphalt is deposited on the shale formations and cuttings so as to prevent the water of the drilling emulsion from attacking the shale and causing it to disintegrate or disperse.

An especially good organic cationic emulsifier or colloid deposition-inducing agent for making asphalt oil-in-water emulsions of the present invention, and to be used in conjunction with the nonionic deposition-retarding agent Redicote E12, is an emulsion manufactured by Armour Industrial Chemical Company under the name of Redicote E11. Redicote E11 is a chloride salt of quaternary ammonium compound which may be dissolved in a substance such as isopropyl alcohol for ease of handling and dissolving it and emulsifying it in the blown asphalt-oil mixture and water. One well known process of preparing quaternary ammonium compound which is in rather widespread industrial use involves the alkylation of alkyl secondary amines with alkyl halides to produce tetra-alkyl-ammonium halides. In general, this process can be represented by the following equation

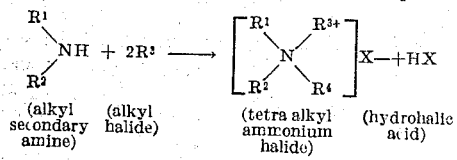

(alkyl secondary amine) (alkyl halide) (tetra alkyl ammonium halide) (hydrohalic acid)

wherein $R^1$ has a carbon chain of from 8 to 20 and where the other R's are hydrogen and/or $C_{1-4}$ alkyl groups. The cationic emulsifier not only acts as an emulsifier for emulsifying the blown asphalt-oil phase in water to form a temperature stable and shale stable emulsion, but in addition promotes the coating out of the blown asphalt on the shale formation or cuttings. Presumably this action results because of the tendency of quaternary ammonium compound to adsorb on clay or shale surfaces and render them preferentially oil wet.

The deposition-retarding agent Redicote E12 controls the rate of deposition of blown asphalt from the oil phase of the drilling fluid onto the shale. Thus, excessive loss of asphalt from the drilling emulsion to the shale in the form of a coating can be reduced by increasing the ratio of the deposition-retarding agent to that of the deposition-inducing agent. If the asphalt deposition-inducing agent were to be used alone, the deposition of asphalt takes place so rapidly that the drilling emulsion being used loses all of its asphalt within a matter of minutes. If on the other hand the deposition-retarding agent is used alone, the shale cuttings are not coated to any significant extent and erode or disintegrate rapidly. The minute particles of the shale eroded off the cuttings become dispersed in the drilling emulsion to load it with solids which slows down the drilling rate.

Optimum conditions for using the method of the present invention were found to be one part of cationic emulsifier or deposition-inducing agent for ten parts of the blown asphalt-oil phase in an oil-in-water drilling emulsion. With this composition, a 5 to 1 ratio of emulsifier was used to deposition-retarding agent on a volume basis. Emulsions were prepared using a ratio of 1 part of the emulsifier to 5 to 20 parts of the asphalt-oil, the latter being generally a 50/50 mixture of blown asphalt and diesel oil. The ratio of the emulsifier or asphalt-deposition inducing agent to the deposition-retarding agent may vary from 10 to 1, to 1 to 1. It is to be understood that the precise ratio of deposition-inducing agent to deposition-reducing agent may be varied depending upon the rate and extent of deposition of asphalt on the shale cuttings, which rate is dependent on various factors such as temperature, amount of shale present relative to the oil phase, rate at which the particular shale disintegrates, species of salt and concentrations thereof, and other well conditions encountered.

Other things being equal, the heaviest asphalt coatings on shale are obtained in the absence of any salt in the drilling emulsion. The thickness of the asphalt coating decreases with an increase in salt concentration. However, since the cuttings are better preserved in brine emulsions because of the inhibiting influence of the dissolved salts, this more than compensates for the thinner asphalt coatings on the shale.

Higher well temperatures result in more rapid deposition of asphalt on shale cuttings and hence a higher ratio of deposition-retarding agent would be needed to cut down this rapid deposition. While good high temperature drilling fluids can be made using a 1 to 1 ratio of asphalt deposition-inducing agent and deposition-retarding agent, lesser amounts of deposition-retarding agent are used at very high temperatures and with heavy concentrations of salt present. Thus, when using a 5 to 1 ratio of asphalt deposition-inducing agent to the asphalt deposition-retarding agent, there was good temperature stability to the emulsions at temperatures greater than 270° F. when 15% sodium chloride was present or when the emulsion was saturated with sodium chloride.

It is to be understood that the deposition-retarding agent may also be an emulsifier in making emulsions according to the present invention. Emulsions made with Redicote E12 alone were found to have about the same API filter loss as a similar emulsion made with Redicote E11 alone. The combination of the two was slightly more effective than an equal amount of either separately. In particular, a small amount of Redicote E12 added to a Redicote E11 emulsion gives a disproportionately large reduction in filter loss. The API filter loss can be decreased by increasing the concentration of Redicote E11 and E12 at a constant ratio until the total volume of the two is about 10% of the volume of the oil-blown asphalt phase. Thus, a drilling emulsion of the present invention containing about 1.25% diesel oil and 1.25% blown asphalt together with sodium chloride as a weighting agent and 0.25% each of Redicote E11 and E12 gave an API filter loss of 8 cc. Corresponding calcium chloride emulsions had a filter loss of only 3 cc. Higher concentrations of oil and asphalt gave only slightly lower filter losses.

Drilling emulsions made in accordance with the present invention and employing Redicote E11 and Redicote E12 in asphalt emulsions are equally effective whether the drilling fluid is acidic or basic. No difference is found between high or low pH emulsions (say from 8.5 to 5.8) with respect to the filter loss or emulsion stability at elevated temperatures or their ability to coat shale. In considering all the above ratios, the weights of Redicote E11 and E12 include 15% isopropanol.

One of the main difficulties in working with a low-solids fluid contaminated with shale cuttings is the rapid build-up of drilled solids which cannot be readily extracted from the drilling fluid hence would be recirculated down a well again with the resulting decrease in drilling rate. With emulsions made in accordance with the present invention, the coating action of the asphalt on the shale inhibits the dispersion or disintegration of the cuttings and promotes flocculation or sticking together of fine particles of coated shale as are inevitably dispersed by the action of a drill bit. Thus, with the aid of a settling pit at the surface of sufficient volume, say 200 barrels, or by the use of mechanical separation apparatus such as the centrifuge at the surface, it is possible to maintain a fast-drilling low-solids drilling fluid when drilling through many shale formations.

By using a suitably adjusted formulation of the present asphalt drilling emulsion, quite large amounts of shale can be tolerated in a drilling fluid before significant amounts of asphalt are lost and maintenance treatments of the mud become necessary. The amount of asphalt consumed depend largely upon the amount of fines generated by the drilling process. For instance, calculations on one experiment indicate that 700 barrels of the present emulsions would drill 1500 feet of a 10" hole before the API loss exceeded 20 cc. if the cuttings remain in large fragments, but would drill only 38 feet if the cuttings were all finely ground. The separation of solids from the present drilling fluids is assisted by the tendency of the asphalt to coat the cuttings, inhibit their dispersion and flocculate them so that the fines are precipitated rapidly.

In field practice the blown asphalt-oil mixture is emulsified in water according to the proportions described hereinabove and the resultant oil-in-water emulsion is pumped down the rotating drill string and out the bit on the bottom of the well where the bit is producing earth formation cuttings. At the time the drilling emulsion is originally pumped into the well it is substantially free of solids. The stream of the drilling emulsion is circulated in and out of the well to coat the well wall and the water-dispersible earth cuttings with oil-dispersed colloid, such as blown asphalt, and remove the cuttings from the well. At the surface, the cuttings returning in the fluid stream are removed from the drilling emulsion as by settling or centrifuging, after which the drilling emulsion is recirculated down the well. From time to time additional quantities of the oil-dispersed colloid and the emulsifier are added to and mixed into the drilling fluid stream in an amount sufficient to coat new water-dispersible cuttings generated.

I claim as my invention:

1. A method of drilling wells into earth formations which comprises:
   rotating a drill bit on the bottom of the well to produce earth formation cuttings,
   simultaneously pumping into the well and through the drill bit and thence out of the well an aqueous drilling fluid having an oil-containing oil-dispersed colloid emulsified therein as a sealing agent,
   said drilling emulsion being substantially free of water-dispersed solids when originally added to the well,
   circulating the drilling emulsion in and out of the well to coat the well wall and the water-dispersible earth formation cuttings with said oil-dispersed colloid and to remove the cuttings from the well,
   treating the returning drilling fluid at the surface to reduce the entrained water-dispersed earth solids content made up of said cuttings, and
   recirculating into the well said low-viscosity drilling emulsion after reducing the water-dispersed earth solids content thereof to below 2% by weight of the emulsion.

2. The method of claim 1 including the step of increasing the density of said drilling emulsion by dissolving therein an inorganic salt in an amount equal to at least about 5 percent by weight of the emulsion.

3. The method of claim 1 wherein the drilling emulsion returned from the well is settled in a large volume vessel to reduce the water-dispersed earth solids content thereof.

4. The method of claim 1 wherein the drilling emulsion returned from the well is centrifuged to reduce the water-dispersed earth solids content thereof to a value of less than 2% by weight of said emulsion.

5. In a method of drilling a well with well drilling tools, the improvement comprising circulating through said well during drilling, a drilling emulsion comprising:
   a water phase free of solids when added to said well,
   an oil phase of from about 1 to 5% by weight of said drilling emulsion emulsified in said water phase,
   an emulsifier of from about 0.1 to 1.0% by weight of said emulsion, the emulsifier being stable to well conditions,
   from 5 to 70% of said oil phase being an oil-dispersible colloid dispersed therein, and
   said water phase including at least 5% by weight of at least one soluble inorganic salt dissolved therein and said emulsion having an API filter loss against filter paper below 10 cc. when mixed with 0.5% by weight of solid inorganic particles having sizes ranging from 0.2 to 10 microns and maintaining at a low viscosity by continually controlling the water-dispersed insoluble solids content of said emulsion at a value of below 2% by weight.

6. A method of drilling wells into earth formations which comprises:
   rotating a drill string in a well and a drill bit on the bottom of the well to produce earth formation cuttings,
   simultaneously pumping into the well through said drill string and bit and thence out of the well an aqueous drilling fluid having an organic cationic emulsifier added thereto and an oil-dispersible colloid dispersed in a minor amount of an oil and emulsified in said aqueous drilling fluid,
   said resultant drilling emulsion being substantially free of water-dispersed solids when pumped into the well,
   circulating a stream of said drilling emulsion in and out of the well to coat the well wall and the water-dispersible earth cuttings with said oil-dispersed colloid and to remove the cutting from the well,
   removing the water-dispersed cuttings from the returning stream of drilling fluid,
   recirculating the stream of drilling fluid down the well, and
   adding to and admixing in the drilling fluid stream being recirculated additional quantities of said oil-dispersed colloid and said emulsifier in an amount sufficient to coat new water-dispersible cuttings generated by the drill bit.

7. The method of claim 6 including the step of adding to and maintaining in said drilling fluid a deposition-retarding agent that slows down the rate at which said oil-dispersed colloid coats the formation of the well and the water-dispersible cuttings generated.

References Cited by the Examiner

UNITED STATES PATENTS

| | | | |
|---|---|---|---|
| 2,151,029 | 3/1939 | Vander Henst | 175—65 |
| 2,661,334 | 12/1953 | Lummus | 252—8.5 |
| 2,773,031 | 12/1956 | Tailleur | 252—8.5 |
| 2,870,990 | 1/1959 | Bengey | 175—66 |
| 2,898,294 | 8/1959 | Priest et al. | 166—42.1 |
| 3,062,740 | 11/1962 | Reddie et al. | 252—8.5 |

JACOB L. NACKENOFF, *Primary Examiner.*

CHARLES E. O'CONNELL, *Examiner.*

T. A. ZALENSKI, S. J. NOVOSAD, *Assistant Examiners.*